United States Patent
Satish

(10) Patent No.: US 8,418,251 B1
(45) Date of Patent: Apr. 9, 2013

(54) DETECTING MALWARE USING COST CHARACTERISTICS

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1007 days.

(21) Appl. No.: 12/430,675

(22) Filed: Apr. 27, 2009

(51) Int. Cl.
*G06F 21/00* (2006.01)

(52) U.S. Cl. .................. 726/24; 726/22; 726/25

(58) Field of Classification Search .......... None
See application file for complete search history.

(56) References Cited

U.S. PATENT DOCUMENTS

| | | | |
|---|---|---|---|
| 7,784,098 B1* | 8/2010 | Fan et al. | 726/25 |
| 2006/0153204 A1* | 7/2006 | Wang et al. | 370/400 |
| 2006/0190417 A1* | 8/2006 | Hilkemeyer et al. | 705/400 |
| 2008/0027891 A1* | 1/2008 | Repasi et al. | 706/52 |
| 2008/0127336 A1* | 5/2008 | Sun et al. | 726/22 |
| 2008/0301796 A1* | 12/2008 | Holostov et al. | 726/12 |
| 2009/0019546 A1* | 1/2009 | Park et al. | 726/24 |
| 2009/0133125 A1* | 5/2009 | Choi et al. | 726/24 |
| 2010/0242109 A1* | 9/2010 | Lee | 726/22 |

OTHER PUBLICATIONS

B. Boehm, et al. "Software Development Cost Estimation Approaches—A Survey," Annals of Software Engineering, 2000, pp. 177-205.*
P. Mell, et al. "Guide to Malware Incident Prevention and Handling," NIST, Special Publication 800-43, Nov. 2005, See Ch. 2.*

* cited by examiner

*Primary Examiner* — Jung Kim
*Assistant Examiner* — Robert Leung
(74) *Attorney, Agent, or Firm* — Fenwick & West LLP

(57) ABSTRACT

A security module determines cost characteristics reflecting costs incurred in developing and/or deploying a software application, and determines whether the software application is malicious based at least in part on the cost characteristics. The security module determines (1) cost characteristics reflecting costs associated with an installer tool used to generate an installation package of the software application, (2) cost characteristics reflecting costs associated with a development tool used to develop the software application, and (3) cost characteristics reflecting costs incurred in deploying the software application. If the cost characteristics indicate that substantial cost was incurred in developing and/or deploying the application, the security module determines that the application is legitimate. Otherwise the security module considers other traits of the application to determine whether it is malicious.

20 Claims, 4 Drawing Sheets

DETECTING MALWARE USING COST CHARACTERISTICS

BACKGROUND

1. Field of Disclosure

The disclosure generally relates to the field of computer security, and in particular to detecting malicious software.

2. Description of the Related Art

Modern computer systems are vulnerable to a wide variety of malicious software ("malware"). Many computer security solutions have been developed to enhance computer security by detecting malware and preventing the detected malware from performing undesirable operations. Traditionally, the security solutions examine the target software for a set of distinguishing fingerprints known to be associated with malware, and determine whether the target software is malicious based on the presence of the fingerprints.

Because the signature-based detection cannot detect a piece of malware without knowing its signature, some security solutions utilize behavior-based detection techniques. These techniques use heuristics to identify suspicious behaviors of a target software application. If the target software application's behaviors fit certain suspicious behavior patterns (e.g., attempting to modify/delete an operating system registry), the security solution identifies the target software application as malware and prevents the behaviors from harming the computer system.

Behavior-based detection techniques can generate false-positive malware detections if a legitimate application performs behaviors deemed suspicious. Security solutions with a high false positive rate frustrate users by blocking legitimate applications from performing desired tasks or by issuing false alerts to which the user must respond. Accordingly, there is a need for techniques that can improve the quality of behavior-based malware detection.

SUMMARY

Embodiments of the present disclosure include methods (and corresponding systems and computer program products) for determining whether a software application is malicious.

One aspect of the present disclosure is a computer-implemented method for determining whether a software application is malicious, comprising: identifying a software application resident on a computer system, determining cost characteristics for the software application, the cost characteristics reflecting costs incurred in developing and/or deploying the software application to the computer system, determining whether the software application is malicious based at least in part on the cost characteristics, and reporting the software application as malicious responsive to the software application being determined malicious.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Developers of software applications incur various costs in developing and deploying the software applications. Such cost can be directly or indirectly estimated by analyzing the software applications. Because of its illegal nature, malware is typically developed and deployed at low cost. Therefore, the cost characteristics of a software application can be taken into consideration in determining whether the software application is malware.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
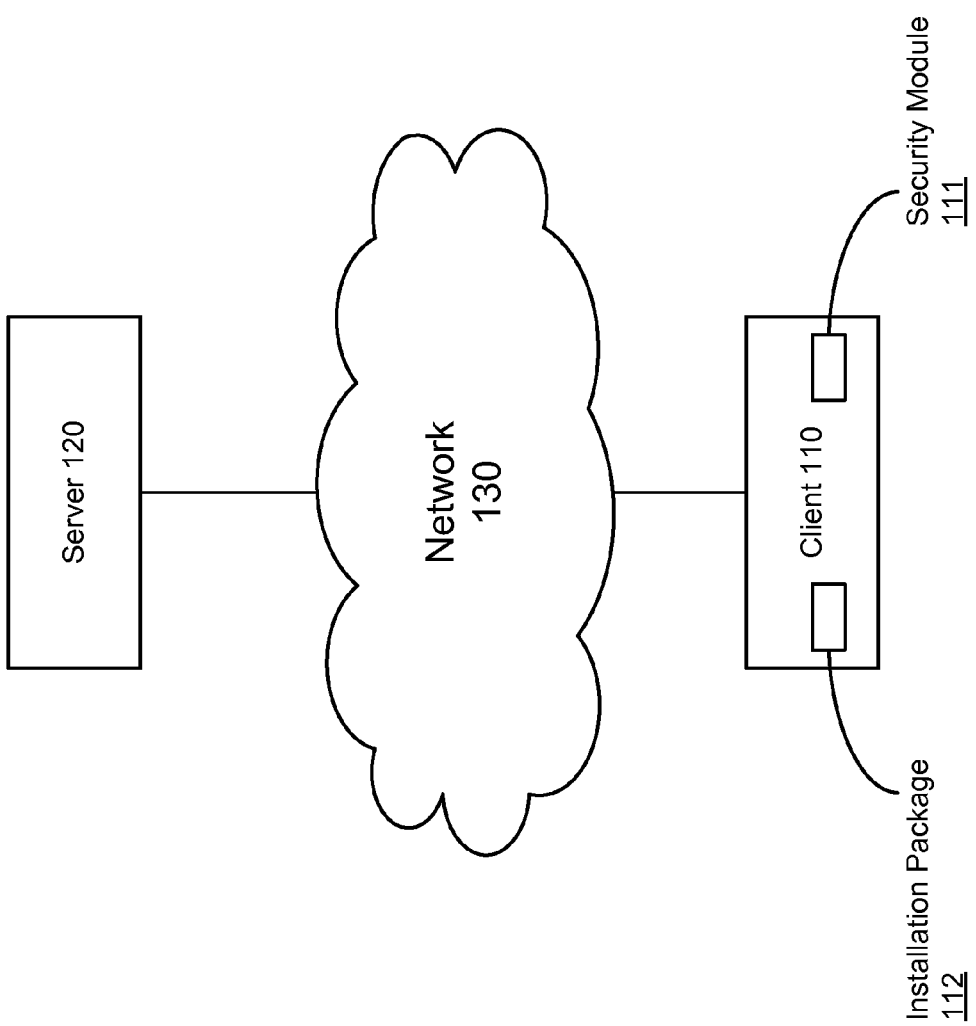
FIG. 1 is a high-level block diagram of a computing environment according to one embodiment of the present disclosure.

FIG. 1 is a high-level block diagram that illustrates a computing environment 100 according to one embodiment. As shown, the computing environment 100 includes a client 110 and a server 120 connected by a network 130. Only one of each entity is illustrated in order to simplify and clarify the present description. There can be other entities in the computing environment 100 as well.

The server 120 is a computer system configured to provide an application deployment service for deploying applications to clients 110. Examples of the deployment service include software distribution service (e.g., application downloading), application activation/deactivation service, version/key management service (e.g., version tracking), patching/update management service, to name a few. The server 120 communicates with the client 110 to provide the deployment service. The server 120 typically has an Internet protocol (IP) address that identifies the server 120 in the network 130. An example of the server 120 is a web server that provides the application deployment service through a web interface. The server 120 typically provides software applications as installation packages.

The client 110 is a computer system configured to execute a variety of software applications (e.g., web browser, email application, word processor) and communicate with the server 120. Examples of the client 110 include a personal computer, a mobile telephone, a personal digital assistant (PDA), etc. As shown in FIG. 1, the client 110 includes a security module 111 and an installation package 112.

The installation package 112, when executed on the client 110, installs a software application onto the client 110. Software applications typically are provided in installation packages to facilitate installation, initial setup, uninstallation, and cleanup on the client 110. The installation package 112 typically includes identifying information such as a digital signature that includes relevant information such as a brief description of the underlying software application and the installer tool used to create the installation package 112.

The security module 111 executes on the client 110 to monitor and analyze software applications residing on the client 110. The security module 111 utilizes information derived from the monitoring and analysis to determine whether a software application is legitimate or malicious. The security module 111 estimates costs associated with the software application, and determines whether the software application is malicious based at least in part on the estimated costs. These cost estimates can involve characteristics of the installation package associated with the software, the deployment server used to deploy the software, and the software itself. If an application is determined malicious, the security module 111 can report the determination (e.g., to a user, a security server) and/or prevent the software application from performing undesirable operations (e.g., operations that may cause damage).

The network 130 enables communications between the client 110 and the server 120. In one embodiment, the network 130 uses standard communication technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
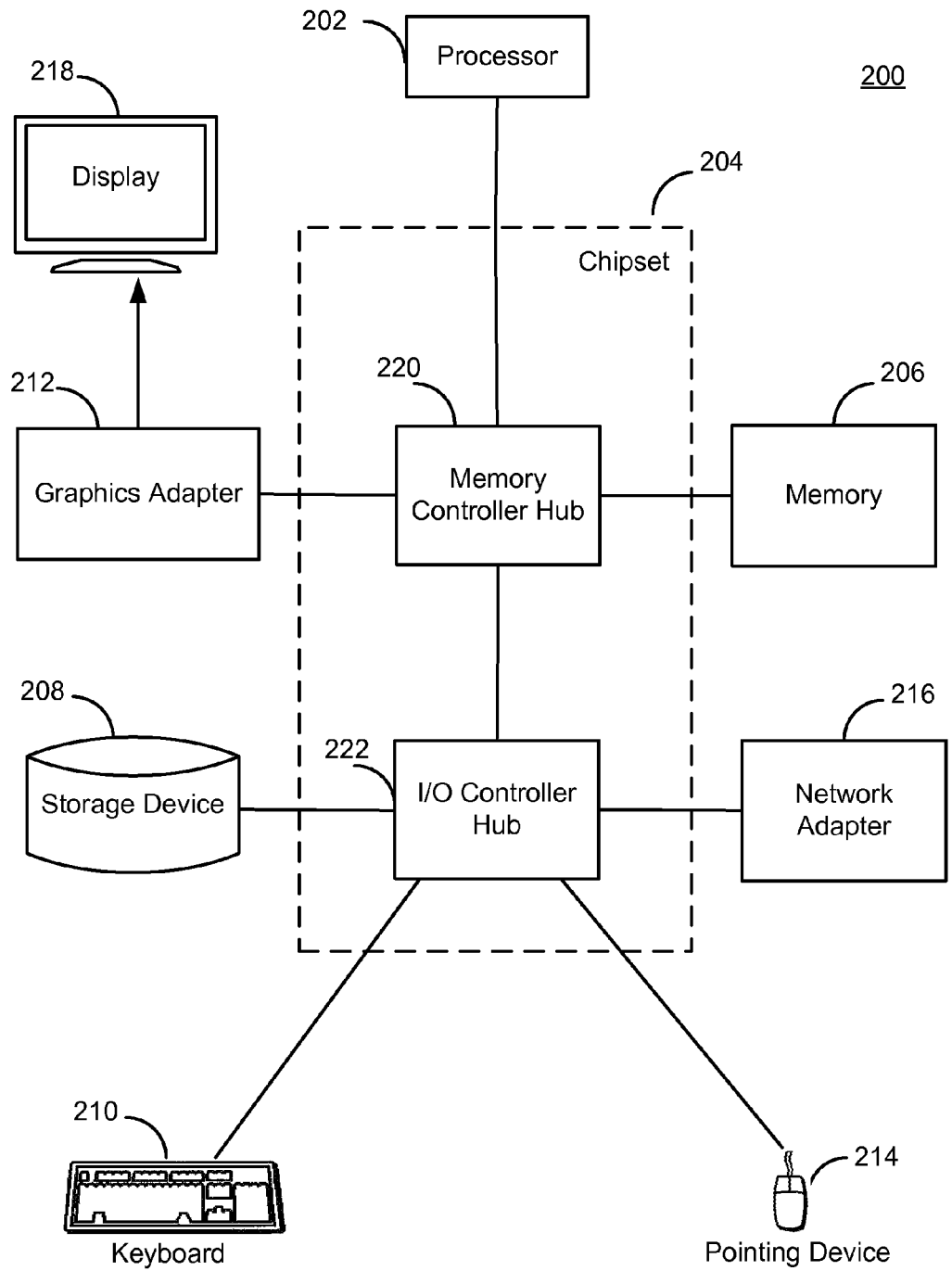
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 120 might comprise multiple blade servers working together to provide the functionality described herein. As another example, the client 110 might comprise a mobile telephone with limited processing power. The computers 200 can lack some of the components described above, such as keyboards 210, graphics adapters 212, and displays 218.

Example Architecture of the Security Module

Figure 3:
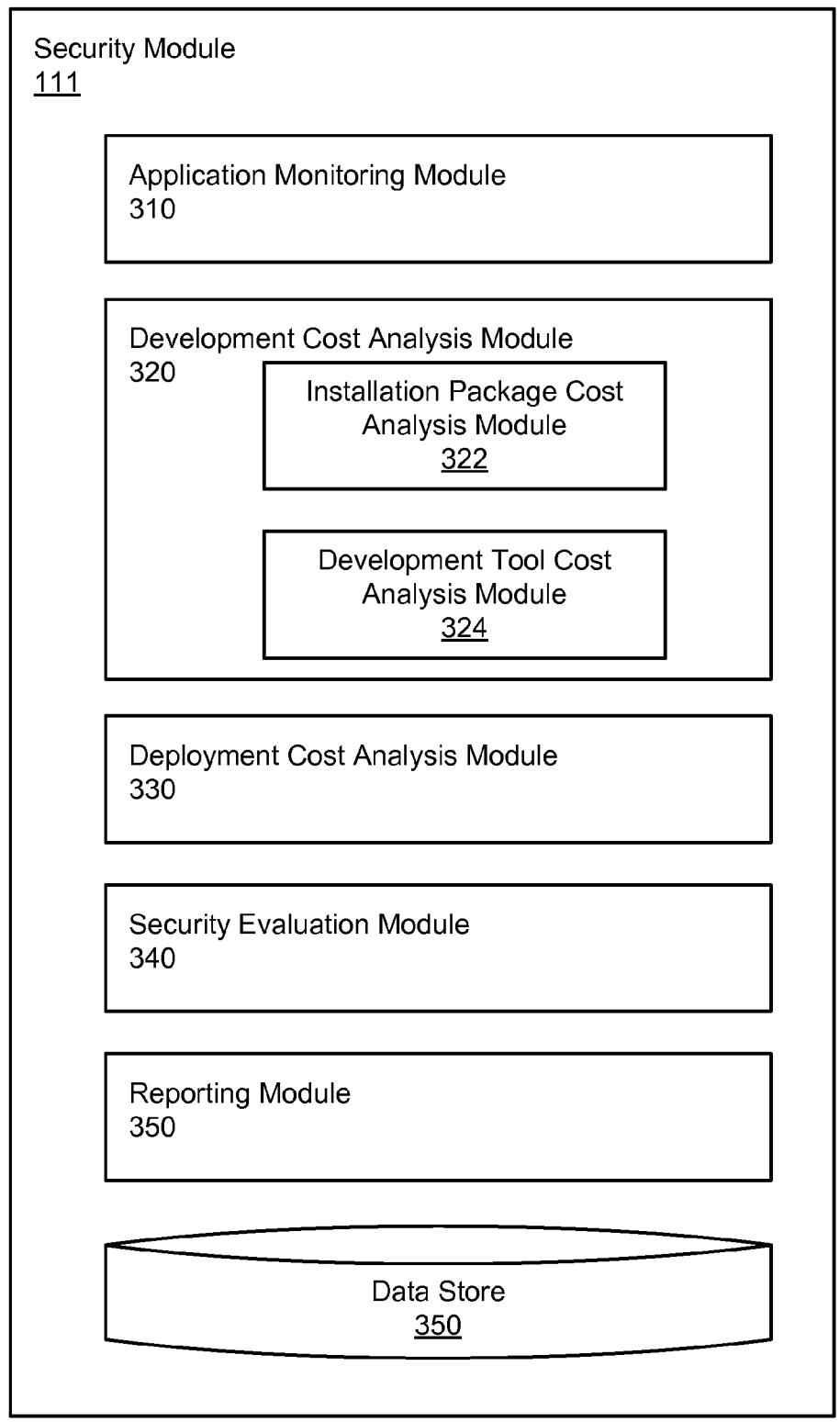
FIG. 3 is a high-level block diagram illustrating modules within a security module according to one embodiment of the present disclosure.

FIG. 3 is a high-level block diagram illustrating a detailed view of modules within the security module 111 according to one embodiment. Some embodiments of the security module 111 have different and/or other modules than the ones described herein. Similarly, the functions can be distributed among the modules in accordance with other embodiments in a different manner than is described here. As illustrated, the security module 111 includes an application monitoring module 310, a development cost analysis module 320, a deployment cost analysis module 330, a security evaluation module 340, a reporting module 350, and a data store 360.

The application monitoring module 310 identifies software applications residing on the client 110 and monitors activities (or operations) performed by the software applications. These monitored activities can include, for example, file system activity such as reads and/or modifications of protected areas of the file system. The application monitoring module 310 also monitors network activities such as by recording the IP addresses from which files are downloaded, and observing the contacted IP addresses or other information about network activities performed by applications on the client 110. The application monitoring module 310 transmits information (e.g., the identified activities, the IP addresses of the contacted servers) about the software application to the security evaluation module 340.

The development cost analysis module 320 analyzes applications residing on the client 110 to determine cost characteristics associated with development of the applications. These development costs include money spent to purchase/license development tools (e.g., development environment, optimization engine, and compiler) used to develop the software application and installer tools used to generate an installation package for the software application.

In one embodiment, the development cost analysis module 320 produces one or more cost scores representing the cost characteristics. The cost score generally indicates the magnitude of the associated cost. For example, the cost score can be a continuous value ranging from 0 to 1, which a score of 0 indicating a very low cost and a score of 1 indicating a very high cost. The cost score can also be a binary value indicating whether the cost is low or high. Other embodiments use different representations of the cost score.

An installation package cost analysis module 322 in the development cost analysis module 320 analyzes installation packages associated with software applications to determine cost characteristics reflecting costs associated with the installers used to generate the packages. Many different installers are available for software developers to use to create installation packages. Some installers are available at a low cost or for free, and typically provide only basic features. Other installers are more expensive and correspondingly provide advanced features.

The installation package cost analysis module 322 identifies the installer used to generate the installation package. In one embodiment, the identification is performed by analyzing the installation package itself to identify the installer tool used to create it. Some installer tools include a digital signature within the installation package, and the signature in turn identifies the installer.

The installation package cost analysis module 322 determines the cost characteristics of the identified installer. In one embodiment, the security module 111 maintains in the data store 360 an installer cost list identifying commonly-used installers and specifying the installers' associated cost characteristics. The installation package cost analysis module 322 searches for the identified installer in the installer cost list. If the identified installer is in the installer cost list, the installation package cost analysis module 322 determines the cost score associated with the installation package based on the cost characteristics of the identified installer. For example, the installation package cost analysis module 322 can use a value specified in the installer cost list as the cost score. In one embodiment, if the installation package cost analysis module 322 cannot find a match in the list, the installation package cost analysis module 322 produces a very low cost score for the installer.

A development tool cost analysis module 324, in turn, analyzes software applications to determine cost characteristics reflecting costs associated with the development tools used to develop the software applications. Software applications are written in computer languages (e.g., C, C++) and compiled into computer-executable code. In order to develop a software application, developers typically use development tools such as editing tools, debugging tools, optimization engines, and compilers. The development tools often leave characteristic attributes (e.g., strings, artifacts) in the generated software applications that can be used to identify the development tools. Similar to installers, some of the development tools are available at a low cost (or for free) and provide limited features, while other development tools are expensive and provide advanced features, such as platform-specific code optimization, that are missing in the low cost development tools.

The development tool cost analysis module 324 can determine the cost characteristics of the development tools used in developing a software application by conducting static analysis of the code of the software application for attributes associate with the development tools. The code may include data, such as text strings, that explicitly identify one or more of the development tools. In one embodiment, the security module 111 maintains in the data store 360 a development tool cost list identifying commonly-used development tools and specifying the tools' associated cost characteristics. The development tool cost analysis module 324 determines the cost score associated with the development tool based on the cost characteristics of the identified tool.

Even if the code does not include data explicitly identifying the development tools, the code may also include data that the development tool cost analysis module 324 can use to infer the cost of the development tools. For example, if the code of a software application includes instructions that are platform-specific (e.g., a computer architecture-specific parallelization instruction), the development tool cost analysis module 324 can infer that the application was developed using high cost development tools (e.g., a platform-specific compiler), and produce a high cost score associated with the development tool. If no such instructions are detected in an application, the development tool cost analysis module 324 can produce a low development cost score.

The deployment cost analysis module 330 analyzes software applications to determine cost characteristics reflecting costs incurred in deploying the software applications. As described above, software developers/providers incur costs in providing application deployment services such as software distribution, application activation/deactivation, version/key management, and patching/update management services. Some deployment service providers provide high quality (e.g., high bandwidth) deployment services at a high cost, while other service providers provide inferior deployment services at lower cost (or for free).

The deployment cost analysis module 330 can estimate the deployment cost associated with a software application by analyzing its network activity monitored by the application monitoring module 310. In one embodiment, the deployment cost analysis module 330 identifies the IP address used by an application and determines whether the address is associated with a known deployment service. In one embodiment, the security module 111 maintains in the data store 360 a service provider cost list identifying known deployment service providers (based, e.g., on their IP addresses) and the providers' associated cost characteristics. The deployment cost analysis module 330 produces a deployment cost score for the application based on the cost characteristics contained in the list. If the network activities are directed to unknown sources, an embodiment of the deployment cost analysis module 330 produces a low deployment cost score for the application.

The security evaluation module 340 evaluates software applications executing on the client 110 to determine whether they are malicious or legitimate. In one embodiment, the security evaluation module 340 assesses multiple traits (or factors, characteristics) of an application in order to determine whether the application is malware. Examples of the traits include whether known malware signatures are present, the behaviors performed by the application, and the cost characteristics described above. The security evaluation module 340 identifies the traits associated with an application, applies weights to the traits, and determines whether the application is malicious based on the weighted traits. The weights generally indicate how dispositive a trait is in the maliciousness determination. For example, the presence of a known malware signature in an application is highly-dispositive and thus typically has a high weight. A given behavior that is performed by both malicious and non-malicious applications, such as reading the operating system registry, is not particularly dispositive when considered alone and thus has low weight.

In one embodiment, if the cost scores for a software application indicate that it is likely that substantial costs are incurred in developing and/or deploying the software application, then the security evaluation module 340 assigns a high weight to the cost characteristics compared to the other traits, and establishes a strong presumption that the software application is legitimate. On the other hand, if the associated cost scores indicate that the costs incurred are low, then the security evaluation module 340 assigns a low weight to the cost characteristics comparing to the other traits, and determines whether the software application is malicious based primarily on the other traits. This technique is based on the assumption that malicious developers are more likely to use lower-cost development tools. Thus, a high cost score tends to establish that the developer is legitimate. As a result, the use of cost scores can reduce false positive detections of malicious software by discounting suspicious behaviors performed by applications developed with expensive development tools.

In one embodiment, the security evaluation module 340 determines whether the cost associated with a software application is substantial by comparing the associated cost scores with one or more customizable threshold values. For example, the security evaluation module 340 can combine the installer, development, and deployment cost scores into a total cost score, and then compare the total cost with the threshold value. The security evaluation module 340 can apply different weights to the individual cost scores. For example, the deployment cost score can be weighted to have more influence than the other scores.

The reporting module 350 reports malware detected on the client 110. The reporting module 350 works with the security evaluation module 340 to receive information about malware detections. In one embodiment, the reporting module 350 reports the malware detection by displaying a visual alarm (e.g., a pop-up dialog box) with information about the software application determined malicious (e.g., software application identity, malicious activity attempted). The reporting module 350 can also report the malware detection by transmitting the malicious software application to a security server (e.g., through the network 130) for further analysis. Further, the reporting module 350 can take actions to prevent the malware from affecting the computer system. For example, the reporting module 350 can end the execution of the malware.

The data store 360 stores data used by the security module 111. Examples of such data include the installer cost list, the development tool cost list, the service provider cost list, malware fingerprints, and the determined cost characteristics. The data store 360 may be a relational database or any other type of database.

Example Methodology

Figure 4:
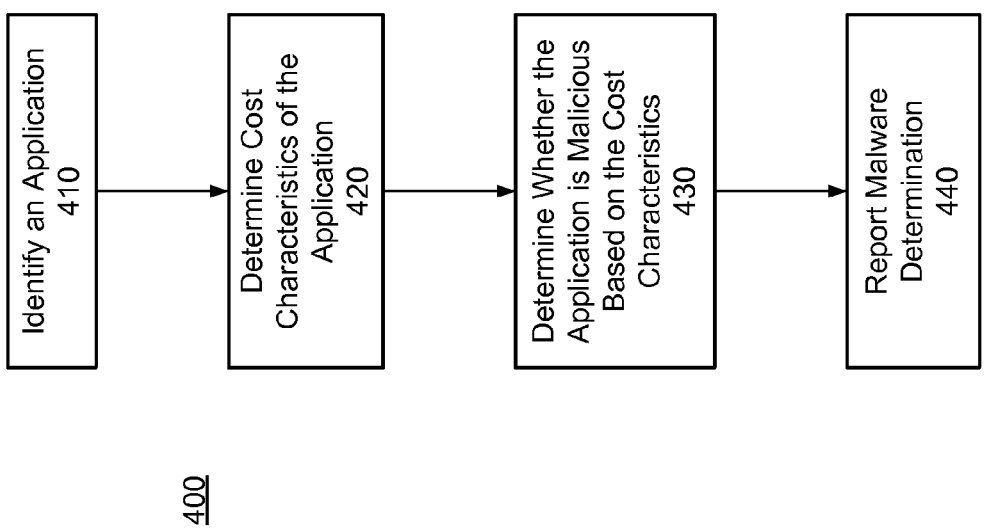
FIG. 4 is a flowchart illustrating a process for the security module to determine whether an application is malicious based on associated cost characteristics, according to one embodiment.

FIG. 4 is a flowchart illustrating a process 400 for the security module 111 to determine whether an application is malicious based on associated cost characteristics, according to one embodiment. Other embodiments can perform the steps of the process 400 in different orders. Moreover, other embodiments can include different and/or additional steps than the ones described herein.

Initially, the security module 111 identifies 410 a target application on the client 110. The security module 111 monitors the activities of the target application by, for example, observing its file system and network activities. The security module 111 may also identify 410 applications that newly become available (e.g., downloaded, installed) on the client 110, even if such applications are not yet executed.

The security module 111 determines 420 the cost characteristics of the identified application. As described in detail above, the cost characteristics of an application reflect costs incurred in developing and/or deploying the application. Step 420 is described in further detail below with respect to FIG. 5.

The security module 111 determines 430 whether the target application is malicious based at least in part on the determined cost characteristics of the target application. In one embodiment, if the cost characteristics associated with the target application indicate that high costs were incurred in developing and/or deploying the target application, then the security module 111 gives substantial weight to the cost characteristics and uses the cost characteristics as a strong indicator that the target application is legitimate. On the other hand, if the cost characteristics indicate that the costs incurred were likely low, then the security module 111 gives less weight to the cost characteristics and considers other traits of the target application (e.g., malware signature, malicious behavior) in determining 430 whether the target application is legitimate.

If the target application is determined malicious, the security module 111 reports 440 the malware determination/detection. In one embodiment, the security module 111 reports 440 the malware detection to a user (e.g., an end user of a client device, a system administrator) through means such as a pop-up dialog box, a message, and a log file entry. In another embodiment, the security module 111 forwards the target application to a security server for further analysis. Further, the security module 111 can prevent the target application's malicious activities from affecting the computer system.

Figure 5:
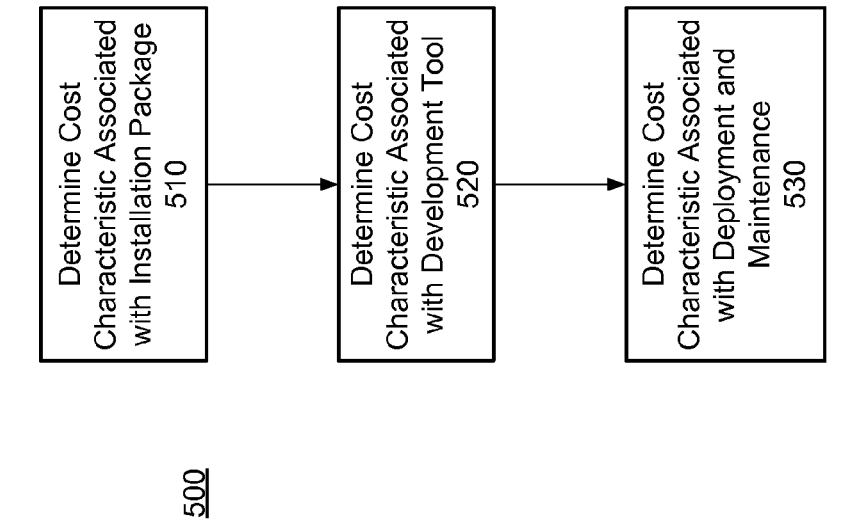
FIG. 5 is a flowchart illustrating a process for the security module to determine cost characteristics of a target application according to one embodiment.

FIG. 5 is a flowchart illustrating a process 500 for the security module 111 to determine 420 cost characteristics of a target application. As shown, the security module 111 determines 510 cost characteristics associated with an installation package of the target application. In one embodiment, the security module 111 determines 510 the cost characteristics by identifying the installer tool used to generate the installation package.

The security module 111 also determines 520 cost characteristics associated with development tools used to develop the target application. The security module 111 further determines 530 cost characteristics associated with deployment services used in connection with to the target application. In one embodiment, the security module 111 determines 530 the cost characteristics by identifying network entities associated with the target application (e.g., the server from which the target application was downloaded, the server that the target application contacted for updates) and searching the network entities in a service provider cost list maintained in the data store 360.

The security module 111 may determine all or only parts of the cost characteristics described above. For example, if installer tool information is unavailable for a software application (e.g., no installation package available), the security module 111 may only determine cost characteristics associated with the development tools and the deployment service. Alternatively, the security module 111 may determine that no cost (or a low cost) was incurred in installer tools for the software application.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining whether a software application is malicious based on cost characteristics reflecting costs incurred in developing/deploying the software application. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for determining whether a software application is malicious, comprising:
   using a computer processor to perform steps comprising:
      identifying, by a security module executing on a computer system, a software application resident on the computer system;
      determining, by the security module executing on the computer system, cost characteristics for the software application, the cost characteristics reflecting financial costs incurred in developing the software application;
      determining, by the security module executing on the computer system, whether the software application is malicious based at least in part on the cost characteristics; and
      reporting, by the security module executing on the computer system, the software application as malicious responsive to the software application being determined malicious.

2. The computer-implemented method of claim 1, wherein determining the cost characteristics comprises:
   analyzing the software application to identify an installer tool used to generate an installation package for the software application; and
   determining cost characteristics reflecting financial costs associated with the installer tool.

3. The computer-implemented method of claim 2, wherein determining the cost characteristics reflecting the financial costs associated with the installer tool comprises:
   comparing the identity of the installer tool to an installer cost list for a comparison result, the installer cost list identifying installer tools and associated cost characteristics; and
   determining the cost characteristics reflecting the financial costs associated with the installer tool based on the comparison result.

4. The computer-implemented method of claim 1, wherein determining the cost characteristics comprises:
   analyzing the software application to identify a development tool used to develop the software application; and
   determining cost characteristics reflecting financial costs associated with the development tool.

5. The computer-implemented method of claim 4, wherein analyzing the software application comprises:
   conducting static analysis of code of the software application for an attribute associated with the development tool; and
   identifying the development tool responsive to the attribute;
   wherein determining the cost characteristics reflecting the financial costs associated with the development tool comprises:
      comparing the identity of the development tool to a development tool cost list for a comparison result, the development tool cost list identifying development tools and associated cost characteristics; and
      determining the cost characteristics reflecting the financial costs associated with the development tool based on the comparison result.

6. The computer-implemented method of claim 1, wherein the cost characteristics further reflect financial costs incurred in deploying the software application to the computer system, and determining the cost characteristics comprises:
   analyzing a network communication associated with the software application to identify a deployment service provider associated with the software application;
   comparing the service provider to a service provider cost list for a comparison result, the service provider cost list identifying service providers and associated cost characteristics; and
   determining cost characteristics reflecting financial costs incurred in deploying the software application to the computer system based on the comparison result.

7. The computer-implemented method of claim 1, wherein determining whether the software application is malicious comprises:
   identifying a plurality of traits indicating whether the software application is malicious;
   weighting the plurality of traits responsive to the cost characteristics; and
   determining whether the software application is malicious responsive to the weighted traits.

8. A non-transitory computer-readable storage medium comprising executable computer program code for controlling a processor to perform the steps of:
   identifying a software application resident on a computer system;

determining cost characteristics for the software application, the cost characteristics reflecting financial costs incurred in developing the software application;

determining whether the software application is malicious based at least in part on the cost characteristics; and reporting the software application as malicious responsive to the software application being determined malicious.

9. The computer-readable storage medium of claim 8, wherein determining the cost characteristics comprises:

analyzing the software application to identify an installer tool used to generate an installation package for the software application; and determining cost characteristics reflecting financial costs associated with the installer tool.

10. The computer-readable storage medium of claim 9, wherein determining the cost characteristics reflecting the financial costs associated with the installer tool comprises:

comparing the identity of the installer tool to an installer cost list for a comparison result, the installer cost list identifying installer tools and associated cost characteristics; and determining the cost characteristics reflecting the financial costs associated with the installer tool based on the comparison result.

11. The computer-readable storage medium of claim 8, wherein determining the cost characteristics comprises:

analyzing the software application to identify a development tool used to develop the software application; and determining cost characteristics reflecting financial costs associated with the development tool.

12. The computer-readable storage medium of claim 11, wherein analyzing the software application comprises:

conducting static analysis of code of the software application for an attribute associated with the development tool; and identifying the development tool responsive to the attribute;

wherein determining the cost characteristics reflecting the financial costs associated with the development tool comprises:

comparing the identity of the development tool to a development tool cost list for a comparison result, the development tool cost list identifying development tools and associated cost characteristics; and determining the cost characteristics reflecting the financial costs associated with the development tool based on the comparison result.

13. The computer-readable storage medium of claim 8, wherein the cost characteristics further reflect financial costs incurred in deploying the software application to the computer system, and determining the cost characteristics comprises:

analyzing a network communication associated with the software application to identify a deployment service provider associated with the software application;

comparing the service provider to a service provider cost list for a comparison result, the service provider cost list identifying service providers and associated cost characteristics; and determining cost characteristics reflecting financial costs incurred in deploying the software application to the computer system based on the comparison result.

14. The computer-readable storage medium of claim 8, wherein determining whether the software application is malicious comprises:

identifying a plurality of traits indicating whether the software application is malicious;

weighting the plurality of traits responsive to the cost characteristics; and determining whether the software application is malicious responsive to the weighted traits.

15. A system for determining whether a software application is malicious, comprising:

a non-transitory computer-readable storage medium comprising executable computer program code for:

an application monitoring module for identifying a software application resident on a computer system;

a development cost analysis module for determining cost characteristics reflecting financial costs incurred in developing the software application;

a security evaluation module for determining whether the software application is malicious based at least in part on the cost characteristics reflecting the costs incurred in developing the software application; and a reporting module for reporting the software application as malicious responsive to the software application being determined malicious; and a processor for executing the executable computer program code.

16. The system of claim 15, wherein the development cost analysis module comprises:

an installation package cost analysis module for analyzing the software application to identify an installer tool used to generate an installation package for the software application, and determining cost characteristics reflecting financial costs associated with the installer tool.

17. The system of claim 16, wherein the installation package cost analysis module is further for comparing the identity of the installer tool to an installer cost list for a comparison result, the installer cost list identifying installer tools and associated cost characteristics, and determining the cost characteristics reflecting the financial costs associated with the installer tool based on the comparison result.

18. The system of claim 15, wherein the development cost analysis module comprises:

a development tool cost analysis module for analyzing the software application to identify a development tool used to develop the software application, and determining cost characteristics reflecting financial costs associated with the development tool.

19. The system of claim 18, wherein the development tool cost analysis module is further for conducting static analysis of code of the software application for an attribute associated with the development tool, identifying the development tool responsive to the attribute, comparing the identity of the development tool to a development tool cost list for a comparison result, the development tool cost list identifying development tools and associated cost characteristics, and determining the cost characteristics reflecting the financial costs associated with the development tool based on the comparison result.

20. The system of claim 15, wherein the computer-readable storage medium further comprises:

a deployment cost analysis module for determining cost characteristics reflecting financial costs incurred in deploying the software application to the computer system by:

analyzing a network communication associated with the software application to identify a deployment service provider associated with the software application, comparing the service provider to a service provider cost list for a comparison result, the service provider cost list identifying service providers and associated cost characteristics, and determining cost characteristics reflecting financial costs incurred in deploying the software application to the computer system based on the comparison result.

* * * * *